July 8, 1958     T. J. REED     2,842,256
ELEVATING BELT CONVEYOR
Filed Jan. 30, 1956     2 Sheets-Sheet 1
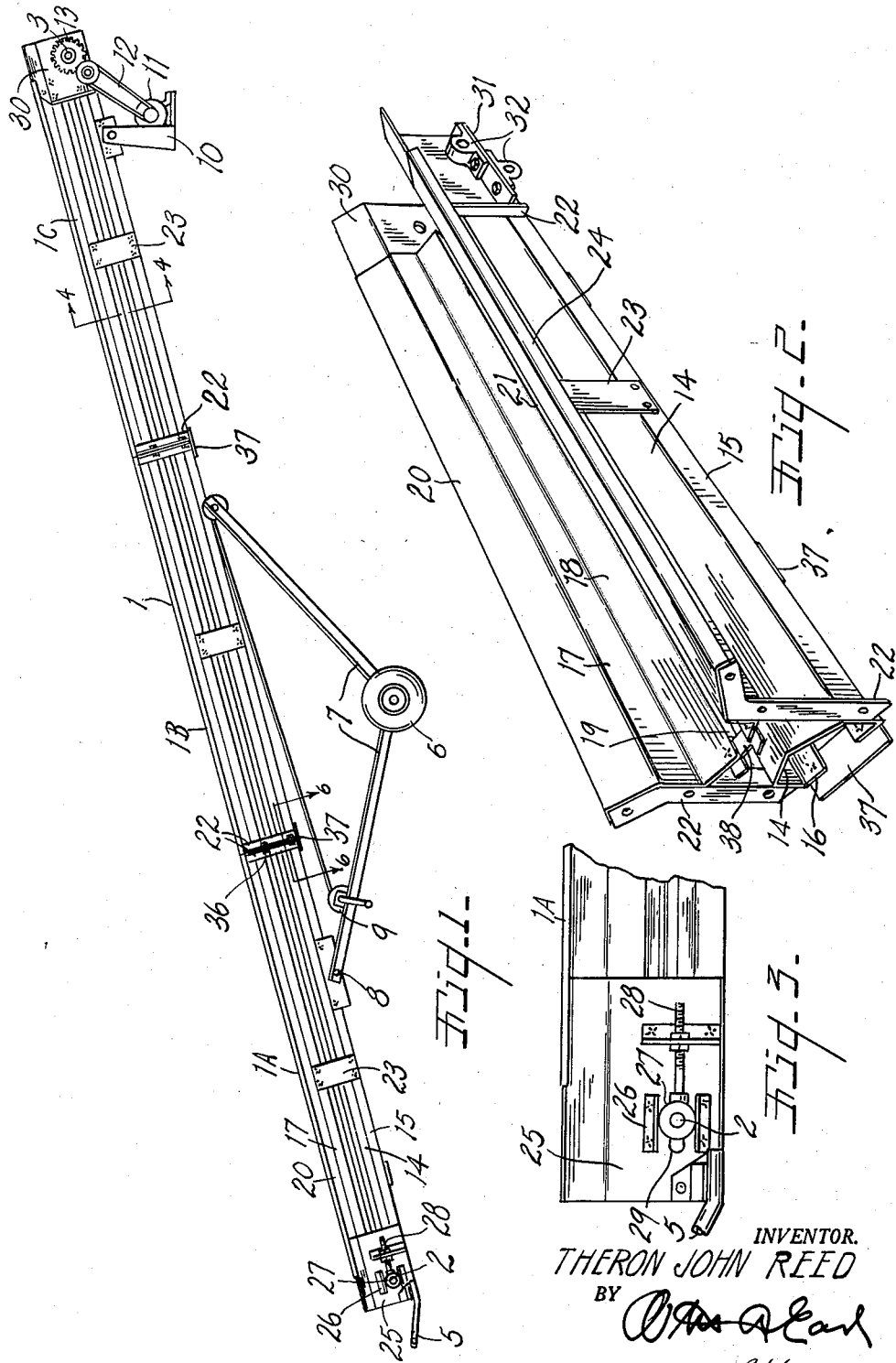
INVENTOR.
THERON JOHN REED

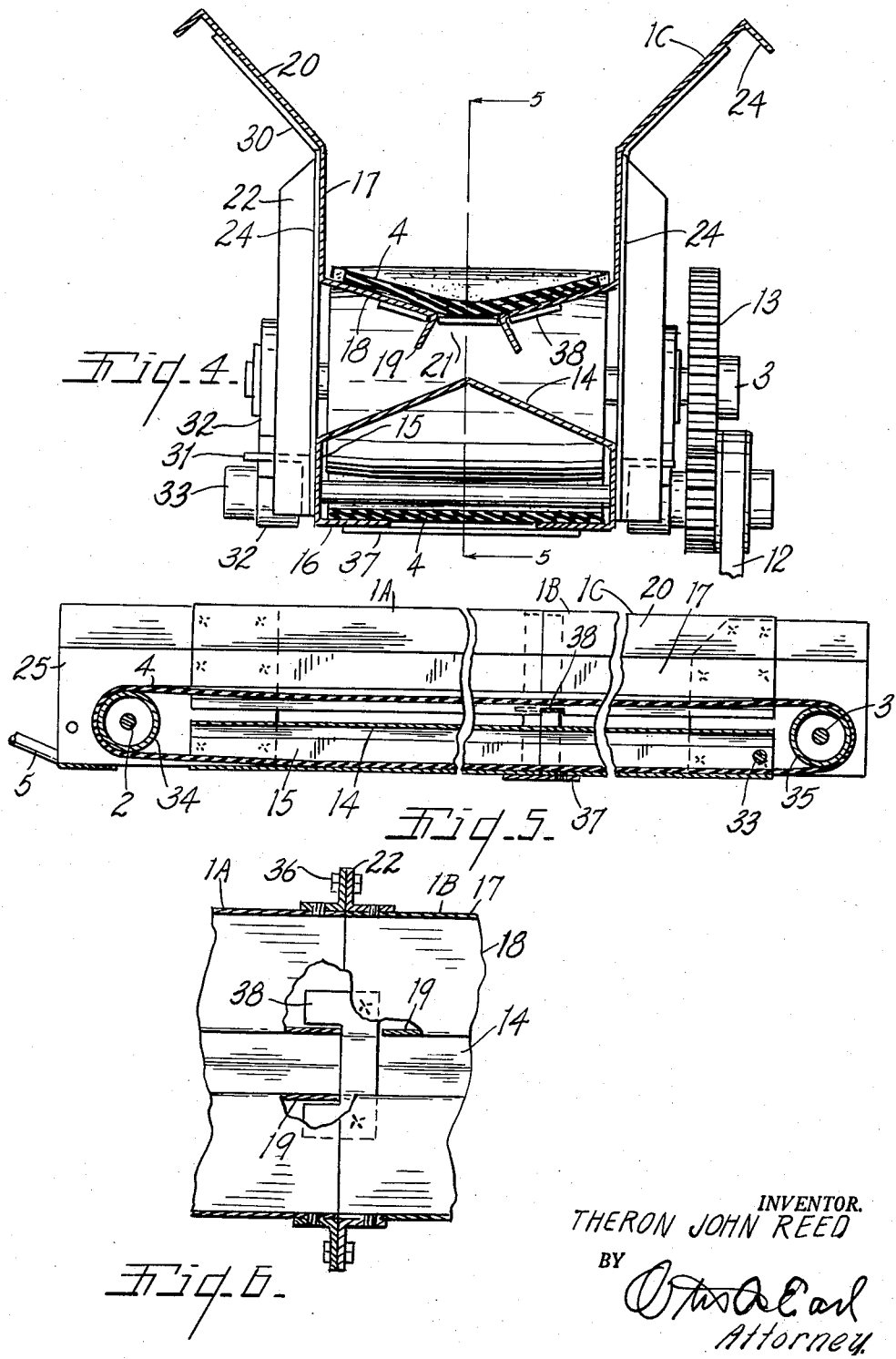

United States Patent Office 2,842,256
Patented July 8, 1958

2,842,256

ELEVATING BELT CONVEYOR

Theron John Reed, Burr Oak, Mich.

Application January 30, 1956, Serial No. 562,099

3 Claims. (Cl. 198—120.5)

This invention relates to improvements in elevating belt conveyor. The principal objects of this invention are:

First, to provide an elevating belt conveyor of the portable type sometimes referred to as a farm elevator and used to elevate farm produce into barns and bins which conveyor provides for the continuous discharge of dirt and other materials from underneath the belt so that the belt is not subject to undue abrasion and wear.

Second, to provide an elevator of the type described in which material being conveyed that leaks over the edges of the upper conveying reach of the belt is rapidly and continuously discharged to the side without falling onto the lower return reach of the belt and without accumulating in pockets underneath the belt.

Third, to provide a simple and relatively inexpensive supporting boom for supporting the reaches of a conveying belt and the pulleys around which the belt is trained which boom is characterized by strength and rigidity coupled with light weight.

Other objects and advantages of the invention will be apparent from a consideration of the following description and claims. The drawings, of which there are two sheets, illustrates a highly practical form of the conveyor.

Fig. 1 is a side elevational view of the complete conveyor.

Fig. 2 is a perspective view of the upper section of the conveyor boom.

Fig. 3 is a fragmentary side elevational view of the lower end of the conveyor boom.

Fig. 4 is a transverse cross sectional view taken along the plane of the line 4—4 in Fig. 1.

Fig. 5 is a fragmentary longitudinal cross sectional view taken along the plane of the line 5—5 in Fig. 4

Fig. 6 is a fragmentary horizontal cross sectional view through a joint in the sectional boom taken along the plane of the line 6—6 in Fig. 1.

As stated in the objects the belt conveyor of the present invention relates to the type of portable or movable conveyor commonly used on farms for elevating farm products to storage bins. The elevator is also frequently used in industrial and building construction operations. Generally the elevator comprises a supporting boom 1 having an idler pulley shaft 2 at its lower end and a drive pulley shaft 3 at its upper end. A continuous conveyor belt 4 is trained around pulleys on the pulley shaft and supported along the boom in a manner to be described in greater detail presently. The lower end of the boom is provided with a projecting tongue 5 by means of which the conveyor may be towed from place to place. A mobile carriage consisting of road wheels 6 and an adjustable A frame 7 is secured to the under side of the boom as at 8 to support the boom at various angles. The angle between the sides of the A frame 7 is adjusted by the winch 9 to change the inclination of the boom. Suspended from the under side of the upper end of the boom is a motor hanger 10 on which an electrical motor 11 is supported and connected by the belt 12 to gearing 13 for driving the drive pulley shaft. The structure thus far described is more or less common to elevating conveyors of this type and it will be understood that various changes and modifications known to the art may be made in the general assembly of the conveyor. Specifically it is sometimes desirable to mount the driving motor and driving pulley shaft at the lower end of the boom and to use modified types of mobile carriages.

The construction of the boom 1 with which this invention is primarily concerned includes three primary load carrying members. These members include a lower plate 14 that is peaked longitudinally along the length of the boom and provided with depending side walls 15 and inturned bottom flanges 16 along its underside. Positioned in spaced relation above the lower plate 14 are a pair of laterally spaced complemental side plates 17 having oppositely inturned and downturned inclined center portions 18 with downturned flanges 19 on their inner edges. Outwardly flared upper walls 20 are desirably provided along the upper edges of the side plates to increase the capacity of the conveyor and to stiffen the boom proper.

With particular reference to Figs. 2 and 4 it will be noted that the depending flanges 19 in the center of the boom are spaced from each other leaving a substantially continuous longitudinal gap or opening 21 along the boom and above the peaked lower plate 14. The side plates 17 and lower plate 14 are interconnected into a single load supporting structure by upright angles 22 and flat tie plates welded or riveted to the side walls 15 of the lower plate and the vertical portions of the side plates 17 at spaced intervals therealong. Where desired the upright angles 22 may be continued along the under sides of the outwardly flared walls 20 to the stiffening flanges 24 on the upper edges of the beam.

At the lower end of the beam a channel shaped end member 25 is secured to the sides of the side plates and the lower plate and projects downwardly therefrom to form a support for the idler pulley shaft 2 and the towing connection 5. The end plate 25 carries vertically opposed angled guides 26 in which a shaft bearing 27 is adjustably mounted and connected by the screw 28 to an abutment on the end plate. The idler shaft 2 projects through slots 29 into the bearings so that the tension in the belt can be adjusted. At the upper end of the boom a second channel shaped end member 30 is fitted around the ends of the side plates and the lower plate of the boom and welded thereto to form a support for the drive pulley shaft 3. Angle brackets 31 are secured to the outer sides of the channel plate to support shaft bearing 32 for the drive pulley shaft and the countershaft 33 of the gearing 13.

The idler pulley 34 mounted on the idler shaft 2 and the drive pulley 35 mounted on the drive shaft 3 are of such diameter that the upper surfaces of the pulleys are approximately opposite the ends of the inclined center portions 18 of the side plates while the lower surfaces of the pulleys are slightly above the inturned flanges 16 on the bottom plate. The upper reach of the belt is thus supported in dished concave fashion along the inclined center portions while the unloaded return reach of the belt is supported in generally flat condition on the flanges 16.

In the operation of the belt and the conveyor as a whole dirt and fine material which is continually working over the side edges of the upper reach of the belt is directed downwardly along the inclined center portions 18 to the longitudinal gap where it is discharged automatically onto the peaked central portion of the lower plate 14 and from there discharged over the sides of the boom without ever coming in contact with the return reach of the belt. There is no chance for this leakage material to be carried along under the upper reach of the belt to collect against an obstruction where it will abrade the underside of the belt or to be carried around the pulleys and cause uneven running of the belt.

In order to simplify construction and shipment of the conveyor and to permit selective variation in the length of the conveyor the boom 1 is made in longitudinal sections three of which are illustrated at 1A, 1B and 1C in Fig. 1. Some of the angles 22 that connect the side plates and lower plate of the boom sections are conveniently mounted at the ends of the boom sections and form convenient connecting means between the sections as it is only necessary to clamp the angles together by bolts 36. The inturned flanges 16 on the bottom of the bottom plate are desirably connected at spaced intervals by flat tie plates 37 to prevent spreading of the peaked bottom plate under load and at one end of each boom section one of the tie plates 37 is conveniently projected as in Fig. 2 to act as a guide in placing adjacent sections into alignment. The downwardly inclined center portions 18 of the side plates are also transversely interconnected at intervals by tie clips 38 welded to the under sides of the inclined portions and out of the path of the upper reach of the belt. A tie clip 38 at one end of each boom section is conveniently notched and projected longitudinally to have an interlocking and centering engagement with the depending flanges 19 on the adjacent boom section.

The conveyor thus constructed and described not only operates effectively with reduced wear on the belt but is relatively light and rigid and easy to assemble due to the manner in which the three primary belt members of the boom are shaped and connected.

Having thus described the invention, what is claimed as new and is desired to be secured by Letters Patent is:

1. In an elevating belt conveyor, the combination of a belt loop and a supporting boom therefor comprising, a lower plate having an upwardly peaked center portion and depending side walls with inturned flanges on the lower edges thereof, complemental side plates having inwardly and downwardly inclined center portions with downturned center flanges spaced from each other throughout their length and outwardly flared upper walls with downturned marginal stiffening flanges, uprights connecting the sidewalls of said lower plate to said side plates at spaced intervals therealong, connecting clips secured to the undersides of said center portions of said side plates at spaced intervals therealong, channel shaped end members secured around the ends of said lower plate and side plates, pulleys mounted within said end members with said belt trained therearound with the upper reach of the belt disposed on said center portions of said side plates and with the lower reach of the belt disposed on said inturned flanges, means for driving the upper one of said pulleys mounted on the upper of said end members, a motor suspended on said lower plate and drivingly connected to said driving means, and a wheeled carriage adjustably connected to the mid-portion of said boom to support the boom at various angles, said lower plate and side plates being divided into longitudinal sections with connecting angles secured to the adjacent ends thereof, part of said connecting clips being secured to the end of a section of said side plates and having laterally spaced ears projecting longitudinally into lapped engagement with the undersides of the adjacent section of side plates on opposite sides of the downturned flanges thereon, said inturned flanges on said lower plate having tie members connected between the undersides thereof at longitudinally spaced intervals therealong with part of the tie members connected to one section of the plate and extending into lapped relation with the inturned flanges on the adjacent section of the lower plate.

2. In an elevating belt conveyor, the combination of a belt loop and a supporting boom therefor comprising, a lower plate having an upwardly peaked center portion and depending side walls with inturned flanges on the lower edges thereof, complemental side plates having inwardly and downwardly inclined center portions with downturned center flanges spaced from each other throughout their length and outwardly flared upper walls, uprights connecting the sidewalls of said lower plate to said side plates at spaced intervals therealong, connecting clips secured to said center portions of said side plates at spaced intervals therealong, channel shaped end members secured around the ends of said lower plate and side plates, pulleys mounted within said end members with said belt trained therearound with the upper reach of the belt disposed on said center portions of said side plates and with the lower reach of the belt disposed on said inturned flanges, means for driving one of said pulleys mounted on the upper of said end members, a motor drivingly connected to said driving means, and a wheeled carriage adjustably connected to the mid-portion of said boom to support the boom at various angles, said lower plate and side plates being divided into longitudinal sections with connecting angles secured to the adjacent ends thereof, part of said connecting clips being secured to the end of a section of said side plates and projecting longitudinally into lapped engagement with the undersides of the adjacent section of side plates, said inturned flanges on said lower plate having tie members connected between the undersides thereof at longitudinally spaced intervals therealong with part of the tie members connected to one section of the plate and extending into lapped relation with the inturned flanges on the adjacent section of the lower plate.

3. In an elevating belt conveyor, the combination of a belt loop and a supporting boom therefor comprising, a lower plate having an upwardly peaked central portion and depending side walls with inturned flanges on the lower edges thereof, complemental side plates having inwardly and downwardly inclined center portions with downturned center flanges spaced from each other throughout their length and stiffening flanges on their upper edges, uprights connecting the sidewalls of said lower plate to said side plates at spaced intervals therealong, connecting clips secured to said center portions at spaced intervals therealong, end members secured to the ends of said lower plate and side plates, pulleys mounted between said end members with said belt trained therearound with the upper reach of the belt disposed on said center portions and with the lower reach of the belt disposed on said inturned flanges, means for driving one of said pulleys mounted on one of said end members, a motor drivingly connected to said driving means, and a wheeled carriage adjustably connected to the mid-portion of said boom to support the boom at various angles, said lower plate and side plates being divided into longitudinal sections with connecting angles secured to the adjacent ends thereof, part of said connecting clips being secured to the end of a section of said side plates and projecting longitudinally into lapped engagement with the undersides of the adjacent section of side plates, said inturned flanges on said lower plate having tie members connected between the undersides thereof at longitudinally spaced intervals therealong with part of the tie members connected to one section of the plate and extending into lapped relation with the inturned flanges on the adjacent section of the lower plate.

References Cited in the file of this patent

UNITED STATES PATENTS

| | | |
|---|---|---|
| 2,430,282 | Ensinger | Nov. 4, 1947 |
| 2,584,288 | Przybylski | Feb. 5, 1952 |
| 2,598,470 | Vutz | May 27, 1952 |
| 2,599,659 | Phillips | June 10, 1952 |